(12) United States Patent
Zhou et al.

(10) Patent No.: US 12,462,073 B2
(45) Date of Patent: Nov. 4, 2025

(54) METHOD FOR PROBABILISTIC ASSESSMENT OF SEISMIC RESISTANCE OF LONG-SPAN ARCH BRIDGE BASED ON TIME-FREQUENCY HYBRID COMPUTATION

(71) Applicants: Chongqing Jiaotong University, Chongqing (CN); Sichuan Highway and Bridge Construction Group Co., LTD, Chengdu (CN); Sichuan Road and Bridge East China Construction Co., LTD, Chengdu (CN)

(72) Inventors: Jianting Zhou, Chongqing (CN); Helu Yu, Chongqing (CN); Zhengsong Xiang, Chongqing (CN); Pengfei Wei, Chongqing (CN); Wei Lu, Chongqing (CN); Zhongbo Tang, Chongqing (CN); Yulong Guo, Chongqing (CN); Chengjun Yan, Chongqing (CN); Jinyang Li, Chongqing (CN)

(73) Assignees: Chongqing Jiaotong University, Chongqing (CN); Sichuan Highway and Bridge Construction Group Co., LTD, Chengdu (CN); Sichuan Road and Bridge East China Construction Co., LTD, Chengdu (CN)

( * ) Notice: Subject to any disclaimer, the term of this patent is extended or adjusted under 35 U.S.C. 154(b) by 0 days.

(21) Appl. No.: 19/058,057

(22) Filed: Feb. 20, 2025

(65) Prior Publication Data
US 2025/0278528 A1    Sep. 4, 2025

(30) Foreign Application Priority Data
Feb. 29, 2024  (CN) .......................... 202410234883.6

(51) Int. Cl.
*G06F 30/13*  (2020.01)
*G01M 5/00*  (2006.01)

(52) U.S. Cl.
CPC .......... *G06F 30/13* (2020.01); *G01M 5/0008* (2013.01); *G01M 5/0066* (2013.01)

(58) Field of Classification Search
CPC ...... G06F 30/00; G06F 30/13; G01M 5/0008; G01M 5/0066
(Continued)

(56) References Cited

U.S. PATENT DOCUMENTS
2020/0284687 A1    9/2020   Yi et al.

FOREIGN PATENT DOCUMENTS
CN    107356962 A        11/2017
CN    109241668 A  *    1/2019  ............. G06F 30/13
(Continued)

OTHER PUBLICATIONS

Alvarez, J.J. et al. "Seismic Assessment of a Long-Span Arch Bridge Considering the Variation in Axial Forces Induced by Earthquakes", Nov. 4, 2011, Engineering Structures 34, Elsevier Ltd. (Year: 2011).*

(Continued)

*Primary Examiner* — Cedric Johnson
(74) *Attorney, Agent, or Firm* — Bayramoglu Law Offices LLC

(57) ABSTRACT

A method for probabilistic assessment of seismic resistance of long-span arch bridge based on time-frequency hybrid computation includes: S1, parameter acquisition; S2, modeling; S3, model preprocessing; S4, piecewise interpolation of a time-frequency modulation function; S5, response expression derivation; and S6, probabilistic assessment of seismic resistance. By integrating spectral decomposition technology, a modal superposition method, and piecewise (Continued)

interpolation technology for time-frequency modulation functions, an explicit response expression of a long-span arch bridge structure is derived under conditions of arbitrary time-frequency modulated seismic excitation, which greatly saves the computational cost of probabilistic analysis of the non-stationary seismic response of the large arch bridge structure, and achieves efficient probabilistic assessment of the seismic resistance of the arch bridge structure.

7 Claims, 3 Drawing Sheets

(58) Field of Classification Search
USPC .............................................................. 703/1
See application file for complete search history.

(56) References Cited

FOREIGN PATENT DOCUMENTS

| CN | 114461979 A | 5/2022 |
|----|-------------|--------|
| JP | 2011095237 A | 5/2011 |

OTHER PUBLICATIONS

Sgambi, L. et al., "Monte Carlo Simulation for Seismic Analysis of a Long Span Suspension Bridge", Sep. 16, 2014, Engineering Structures 78, Elsevier Ltd. (Year: 2014).*
Li, Xi-Mei et al., "Time-Frequency Analysis of Nonlinear Structures under Nonstationary Excitation by Directly Solving Structural Dynamic Equation through Absolute Displacement", May 16, 2024, Soil Dynamics and Earthquake Engineering 182, Elsevier ltd. (Year: 2024).*
Ma, Chunyan et al. "Stochastic Dynamic Analysis of the Train-Track-Bridge System Under Tridirectional Spatially Correlated Ground Motions", Jun. 4, 2022, Soil Dynamics and Earthquake Engineering 160 , Elsevier Ltd. (Year: 2022).*
Helu Yu, et al., Spectral decomposition-based explicit integration method for fully non-stationary seismic responses of large-scale structures, Mechanical Systems and Signal Processing, 2022, pp. 1-15, vol. 168, 108735.
Wei Chen, et al., Stochastic Seismic Response Analysis of Large-Span Bridges with Direct Consideration of the Effects of Proposed Static Displacements, Chinese Journal of Computational Mechanics, 2002, pp. 303-309, vol. 19 No. 3.

* cited by examiner

METHOD FOR PROBABILISTIC ASSESSMENT OF SEISMIC RESISTANCE OF LONG-SPAN ARCH BRIDGE BASED ON TIME-FREQUENCY HYBRID COMPUTATION

CROSS REFERENCE TO THE RELATED APPLICATIONS

This application is based upon and claims priority to Chinese Patent Application No. 202410234883.6, filed on Feb. 29, 2024, the entire contents of which are incorporated herein by reference.

TECHNICAL FIELD

The present disclosure relates to the technical field of bridges, and in particular to a method for probabilistic assessment of seismic resistance of a long-span arch bridge based on time-frequency hybrid computation.

BACKGROUND

Dynamic time-history analysis is a commonly used computation method for the seismic design of a long-span arch bridge. Specifically, seismic resistance of an arch bridge is assessed by using a seismic acceleration sample derived from historical records or simulations as an excitation input for an arch bridge model, and then obtaining a seismic response by numerically solving a dynamic partial differential equation of the arch bridge model. A traditional dynamic time-history analysis usually only focuses on a dynamic response of an arch bridge structure when a single seismic acceleration sample is inputted, with results depending on selection of a specific excitation sample, thereby making it difficult to reflect probabilistic or statistical properties of the seismic response of the arch bridge. In fact, seismic motion is essentially a time-frequency non-stationary random process defined by an evolving power spectrum function, and the dynamic response of the arch bridge under its action exhibits significant uncertainty. In order to eliminate the impact of the uncertainty, it is generally required to use a probabilistic dynamic method to calculate statistical characteristics of the seismic response of the arch bridge, so as to achieve a probabilistic assessment of the seismic resistance of the arch bridge.

At present, computation methods used for probabilistic seismic response analysis of long-span arch bridges are mainly divided into frequency domain methods and time domain methods. For the frequency domain methods represented by an evolutionary spectrum method and a virtual excitation method, it is required to solve a time-varying frequency response function of the arch bridge structure and then obtain an evolutionary response spectrum density of the arch bridge structure through frequency domain integration with a product of the frequency response function and a seismic evolutionary spectrum. For any seismic excitation with a general modulation function, an analytical solution cannot be obtained through the above solution process, and extensive numerical integration is required, thereby resulting in a high computational cost. Moreover, for the time domain methods represented by an explicit time domain method and a Monte Carlo simulation method, it is required to select a large number of seismic acceleration samples as excitation inputs for the arch bridge model, to calculate the dynamic response of the model for each excitation input respectively, and then to obtain the probabilistic characteristics of the seismic response of the arch bridge through statistical analysis of all response samples. The above solution process involves a large number of repetitive solutions to a dynamic model of the arch bridge, which also has the defect of low computational efficiency when applied to large arch bridge structures.

In view of the above problems, the present disclosure provides a method for time-frequency hybrid stochastic dynamic computation based on spectral decomposition and modal superposition techniques, and the method is used for rapid computation of non-stationary seismic response samples of a long-span arch bridge and the probabilistic assessment of seismic resistance thereof. The method is characterized in that a set of orthogonal random variables obtained by frequency domain spectral decomposition are used to discretely characterize a non-stationary seismic excitation, and a quadratic polynomial is used to perform piecewise interpolation on a time-frequency modulation function of seismic excitation, and then an explicit closed-form expression of the non-stationary seismic response of the long-span arch bridge is derived through modal decomposition and a Duhamel integral. Compared with a traditional computation method, the method has the following advantages: an explicit response expression derived can be used for the rapid computation of a large number of response samples of a long-span arch bridge structure under conditions of arbitrary time-frequency non-stationary seismic excitation, which overcomes the defects of a probabilistic dynamic method of the prior art including need of extensive numerical integration or repetitive time-history analysis, and greatly saves the computational cost of probabilistic analysis of the non-stationary seismic response of the large arch bridge structure, thereby achieving efficient probabilistic assessment of the seismic resistance of the arch bridge structure.

SUMMARY

In view of this, the present disclosure provides a method for probabilistic assessment of seismic resistance of a long-span arch bridge based on time-frequency hybrid computation. The method is characterized in that a set of orthogonal random variables obtained by frequency-domain spectral decomposition are used to discretely characterize a non-stationary seismic excitation, and a quadratic polynomial is used to perform piecewise interpolation on a time-frequency modulation function of seismic excitation, and then an explicit closed-form expression of non-stationary seismic response of a long-span arch bridge structure is derived through the modal decomposition and the Duhamel integral. The method is further applied to long-scale rapid computation of seismic response samples of the arch bridge structure, as well as probabilistic assessment of seismic resistance thereof.

To achieve the above objective, the present disclosure adopts the following technical solution:
  a method for probabilistic assessment of seismic resistance of a long-span arch bridge based on time-frequency hybrid computation, including the following steps:
  S1, parameter acquisition: acquiring structural parameters of a long-span arch bridge;
  S2, modeling: constructing a dynamic model of the arch bridge according to the structural parameters acquired in the S1;
  S3, model preprocessing: reducing the dynamic model of the arch bridge in the S2 through modal decomposition, to obtain related data of first N modes of the dynamic model; and decomposing a seismic excitation by use of time-frequency spectrum decomposition technology, to obtain a time-frequency deterministic basis function and an orthogonal random variable of a seismic excitation process;

S4, piecewise interpolation of a time-frequency modulation function: using a quadratic polynomial to piecewise interpolate a modulation function in the time-frequency deterministic basis function in the S3 to obtain a piecewise time-frequency slowly varying modulation function;

S5, response expression derivation: based on the piecewise time-frequency slowly varying modulation function obtained in the S4, obtaining an explicit expression of non-stationary seismic response of the long-span arch bridge structure through the modal decomposition and Duhamel integral; and S6, probabilistic assessment of seismic resistance: simulating a seismic excitation sample using the orthogonal random variable obtained in the S3, and quickly computing a response sample through the explicit response expression obtained in the S5, to assess the seismic resistance of the long-span arch bridge from a probabilistic perspective.

In the above method, optionally, the S2 specifically includes:

constructing the dynamic model of the long-span arch bridge under the condition of time-frequency non-stationary seismic excitation using a finite element method:

$$M\ddot{U}(t) + C\dot{U}(t) + KU(t) = -MEY(t) \tag{2}$$

where M is a mass matrix of the dynamic model of the arch bridge; K is a stiffness matrix of the dynamic model of the arch bridge; C is a damping matrix of the dynamic model of the arch bridge; U is a displacement response vector of the dynamic model of the arch bridge; $\dot{U}$ is a velocity response vector of the dynamic model of the arch bridge; $\ddot{U}$ is an acceleration response vector of the dynamic model of the arch bridge; E represents an influence vector of the seismic excitation; Y(t) represents a seismic excitation input of the dynamic model of the arch bridge at a certain time t, and the seismic excitation input is a non-stationary random process with an arbitrary time-frequency modulation function; and M and K are obtained through a finite element method, and C is constructed based on a Rayleigh damping theory.

In the above method, optionally, the S3 specifically includes the following steps:

S301: modal decomposition: performing modal decomposition on the dynamic model in the S2 to obtain related data of the first N modes of the dynamic model, including a vibration mode, a frequency and a damping ratio, which are denoted as $\overline{\omega}_i$, $\varphi_i$ and $\xi_i$ (i=1, 2, ..., N) respectively, where $\xi_i$ can be calculated as follows:

$$\xi_i = \frac{\alpha + \beta \overline{\omega}_i^2}{2\overline{\omega}_i}; \tag{3}$$

where α and β represent Rayleigh damping coefficients.

S302: spectral decomposition: obtaining an expression of the seismic excitation process through the dynamic model in the S2, and spectrally decomposing the seismic excitation process using a spectral representation method to obtain the time-frequency deterministic basis function and the orthogonal random variable of the seismic excitation process.

In the above method, optionally, the S302 specifically includes:

using the spectral representation method to spectrally decompose a seismic excitation process Y(t):

$$Y(t) = \sum_{j=1}^{2M} \theta_j y_j(t) \tag{4}$$

where $\theta_j$ (j=1, 2, ..., 2M) represents a $j^{th}$ orthogonal random variable, j is a positive integer ranging from 1 to 2M, and $\theta_j$ is expressed as $$\theta_j = \begin{cases} \sqrt{2S(\omega_{(j+1)/2})\Delta\omega}\,\alpha_{(j+1)/2} & j = 1, 3, \ldots, 2M-1 \\ \sqrt{2S(\omega_{j/2})\Delta\omega}\,\beta_{j/2} & j = 2, 4, \ldots, 2M \end{cases} \tag{5}$$

where S(ω) represents a power spectrum density of a stationary random process corresponding to the seismic excitation process Y(t); $\omega_j$ (j=1, 2, ..., M) represents M equally spaced frequency points in an evolutionary spectrum frequency domain interval of seismic excitation;

Δω represents a frequency interval of discrete frequency points; $\alpha_j$ and $\beta_j$ represent $j^{th}$ mean-zero orthogonal random variables; $y_j$ in the formula (4) represents a $j^{th}$ deterministic basis function, which is expressed as $$y_j(t) = \begin{cases} A(\omega_{(j+1)/2}, t)\cos(\omega_{(j+1)/2} t) & j = 1, 3, \ldots, 2M-1 \\ A(\omega_{j/2}, t)\sin(\omega_{j/2} t) & j = 2, 4, \ldots, 2M \end{cases} \tag{6}$$

where t represents a certain moment of the seismic excitation input process; and A(ω, t) represents the time-frequency slowly varying modulation function of the seismic excitation process.

In the above method, optionally, the S4 specifically includes:

for the time-frequency slowly varying modulation function A(ω, t) of the seismic excitation process, where $\omega_j$ represents a $j^{th}$ discrete frequency point, obtaining the time-frequency slowly varying modulation function A($\omega_j$, t) at a determined discrete frequency point, and interpolating the time-frequency slowly varying modulation function A($\omega_j$, t) at the discrete frequency point in a time domain by using a piecewise quadratic polynomial, to obtain the interpolated time-frequency slowly varying modulation function A($\omega_j$, t) at the discrete frequency point, with an expression as follows:

$$A(\omega_j, t) = \sum_{k=1}^{L_j} \left(a_{k2}^j t^2 + a_{k1}^j t + a_{k0}^j\right)\left[\varepsilon(t - t_k^j) - \varepsilon(t - t_{k+1}^j)\right] \tag{7}$$

where $L_j$ represents the number of segments of a modulation function at a $j^{th}$ frequency point; ε(•) represents a unit step function; $t_k^j$ and $t_{k+1}^j$ represent left and right time nodes of a $k^{th}$ piecewise polynomial at the $j^{th}$ frequency point;

$$a_{k0}^j, a_{k1}^j \text{ and } a_{k2}^j$$

represent coefficients of the $k^{th}$ piecewise polynomial at the $j^{th}$ frequency point:

$$\begin{Bmatrix} a_{k0}^j \\ a_{k1}^j \\ a_{k2}^j \end{Bmatrix} = \begin{bmatrix} 1 & t_k^j & (t_k^j)^2 \\ 1 & \frac{t_k^j + t_{k+1}^j}{2} & \left(\frac{t_k^j + t_{k+1}^j}{2}\right)^2 \\ 1 & t_{k-1}^j & (t_{k+1}^j)^2 \end{bmatrix}^{-1} \begin{Bmatrix} A(\omega_j, t_k^j) \\ A\left(\omega_j, \frac{t_k^j + t_{k+1}^j}{2}\right) \\ A(\omega_j, t_{k+1}^j) \end{Bmatrix}. \quad (8)$$

In the above method, optionally, the S5 specifically includes the following steps:

S501: calculating N generalized modal displacements of the arch bridge structure using a Duhamel integral formula, and obtaining mapping relations between the modal displacements and the orthogonal random variables, where a time-varying mapping coefficient can be obtained by analytical solution; and S502: substituting a modal response expression derived from the Duhamel integral into a modal decomposition formula of dynamic response of the arch bridge to obtain the explicit expression of non-stationary seismic response of the long-span arch bridge.

In the above method, optionally, the S6 specifically includes the following steps:

S601: stochasticly simulating S groups of orthogonal random variables using the method in the S302, and sequentially substituting the S groups of orthogonal random variables into the explicit expression of non-stationary seismic response of the long-span arch bridge obtained in the S502, to obtain responses $U_1$, $U_2$, ..., $U_S$ of the long-span arch bridge under the action of corresponding seismic excitation; and S602: performing statistical analysis on the S groups of response samples obtained in the S601, and assessing seismic response characteristics and seismic resistance of the long-span arch bridge from a probabilistic perspective according to statistical analysis results.

It can be seen from the above technical solution that, compared with the prior art, the method for probabilistic assessment of seismic resistance of a long-span arch bridge based on time-frequency hybrid computation provided by the present disclosure, has the following beneficial effects:

by integrating spectral decomposition technology, a modal superposition method, and piecewise interpolation technology for time-frequency modulation functions, an explicit response expression of the long-span arch bridge structure is derived under conditions of arbitrary time-frequency modulated seismic excitation; and the explicit expression can be viewed as a surrogate model of an original arch bridge model and can be used for rapid computation of a large number of seismic response samples of the arch bridge, without need of extensive numerical integration or repetitive time-history analysis required by a traditional computation method, which greatly saves the computational cost of probabilistic analysis of the non-stationary seismic response of the large arch bridge structure, and achieves efficient probabilistic assessment of the seismic resistance of the arch bridge structure.

BRIEF DESCRIPTION OF THE DRAWINGS

In order to more clearly describe the technical solutions in the examples of the present disclosure or in the prior art, a brief introduction to the accompanying drawings required for the description of the examples or the prior art will be made below. Apparently, the accompanying drawings in the following description are merely some examples of the present disclosure, and those of ordinary skill in the art would also be able to derive other drawings from these drawings without making creative efforts.

DETAILED DESCRIPTION OF THE EMBODIMENTS

The technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples obtained by those of ordinary skill in the art without making creative efforts shall fall within the protection scope of the present disclosure.

In the present disclosure, relational terms herein such as first and second are only used to distinguish one entity or operation from another entity or operation without necessarily requiring or implying any such actual relation or order between such entities or operations. The terms "include", "including" or any other variants thereof are intended to cover non-exclusive inclusion, such that a process, method, article or device including a series of elements not only includes those elements, but also includes those elements that are not explicitly listed, or also includes elements inherent to the process, method, article or device. Without more restrictions, the elements defined by the sentence "including a . . . " do not exclude the existence of other identical elements in the process, method, article, or device including the elements.

Figure 1:
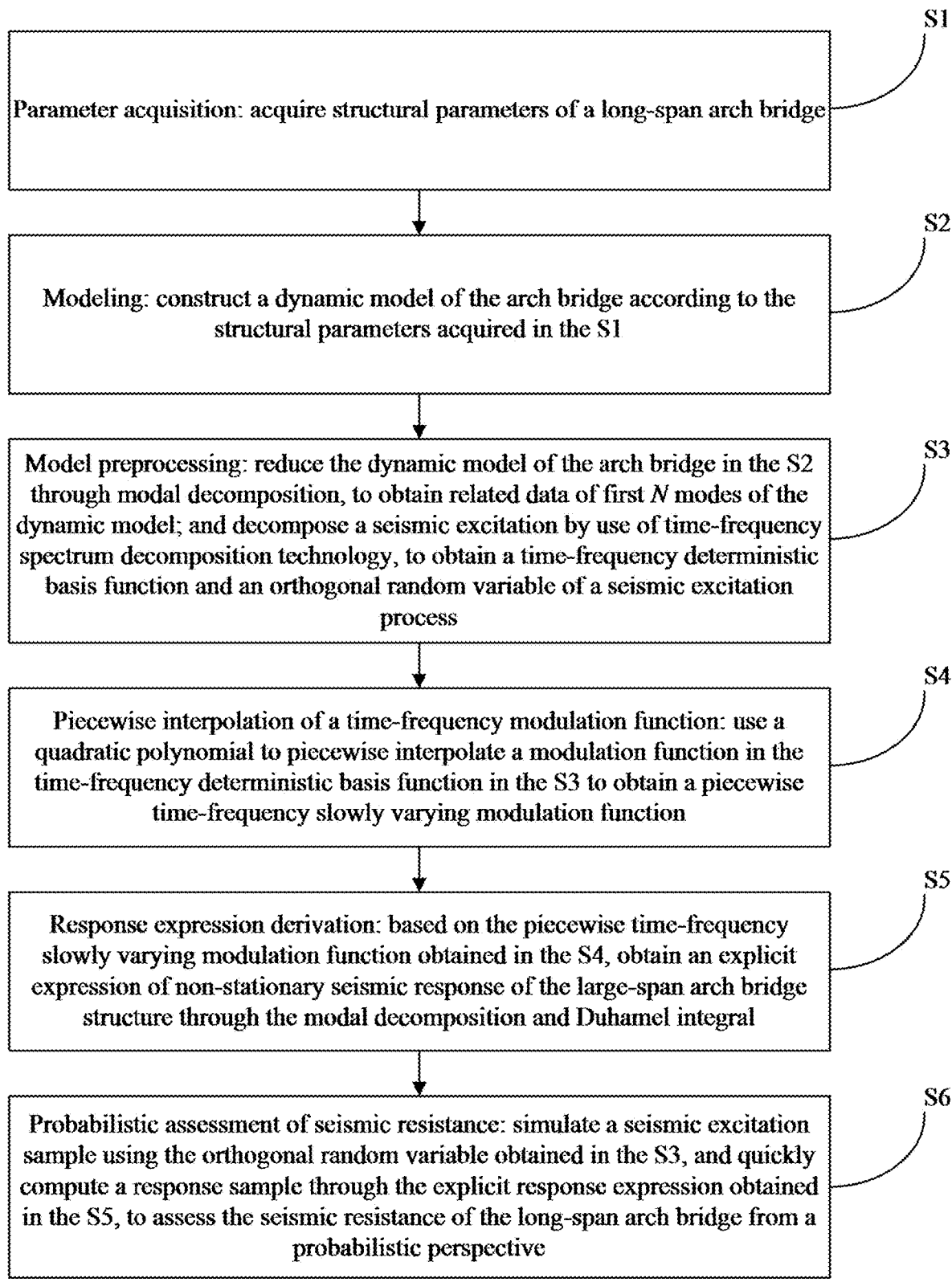
FIG. 1 is a flowchart of a method for probabilistic assessment of seismic resistance of long-span arch bridge based on time-frequency hybrid computation disclosed in the present disclosure.

With reference to FIG. 1, a method for probabilistic assessment of seismic resistance of a long-span arch bridge based on time-frequency hybrid computation, includes the following steps:

S1, parameter acquisition: acquire structural parameters of a long-span arch bridge;

S2, modeling: construct a dynamic model of the arch bridge according to the structural parameters acquired in the S1;

S3, model preprocessing: reduce the dynamic model of the arch bridge in the S2 through modal decomposition, to obtain related data of first N modes of the dynamic model; and decompose a seismic excitation by use of time-frequency spectrum decomposition technology, to obtain a time-frequency deterministic basis function and an orthogonal random variable of a seismic excitation process;

S4, piecewise interpolation of a time-frequency modulation function: use a quadratic polynomial to piecewise interpolate a modulation function in the time-frequency deterministic basis function in the S3 to obtain a piecewise time-frequency slowly varying modulation function;

S5, response expression derivation: based on the piecewise time-frequency slowly varying modulation function obtained in the S4, obtain an explicit expression of non-stationary seismic response of the long-span arch bridge structure through the modal decomposition and Duhamel integral; and S6, probabilistic assessment of seismic resistance: simulate a seismic excitation sample using the orthogonal random variable obtained in the S3, and quickly compute a response sample through the explicit response expression obtained in the S5, to assess the seismic resistance of the long-span arch bridge from a probabilistic perspective.

Figure 2:
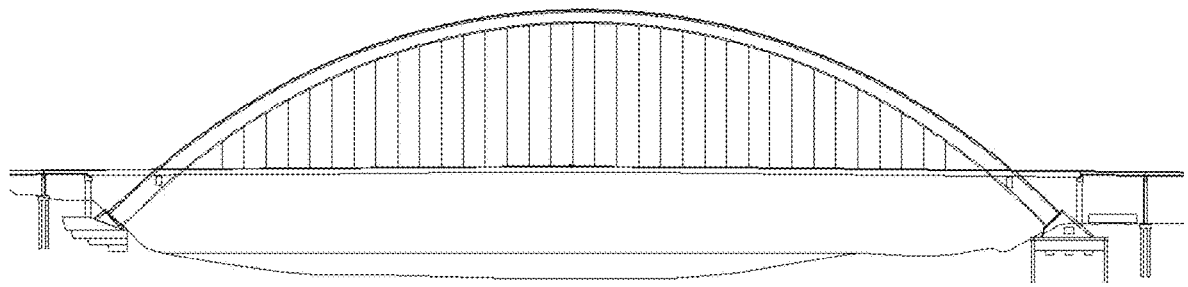
FIG. 2 is a schematic diagram of a long-span arch bridge model disclosed in the present disclosure.

Specifically, taking a long-span half-through arch bridge model shown in FIG. 2 as an example, it is assumed that non-stationary seismic excitation has the following spectral density and time-frequency modulation function:

$$S(\omega) = S_0 \frac{\omega^2}{\omega_0^2}, A(\omega, t) = t\exp\left[-\frac{t}{2}\left(c + \frac{\omega^2}{\omega_0^2}\right)\right] \quad (1)$$

where $S^0$, $\omega^0$ and c are three constants used to control a shape and amplitude of a spectral function of seismic excitation, and values thereof are 3.5E-2 m²/s³, 25.1 rad/s and 0.15 in this example.

Further, the S2 specifically includes:
construct the dynamic model of the long-span arch bridge under the condition of time-frequency non-stationary seismic excitation using a finite element method:

$$M\ddot{U}(t) + C\dot{U}(t) + KU(t) = -MEY(t) \quad (2)$$

where M is a mass matrix of the dynamic model of the arch bridge; K is a stiffness matrix of the dynamic model of the arch bridge; C is a damping matrix of the dynamic model of the arch bridge; U is a displacement response vector of the dynamic model of the arch bridge; $\dot{U}$ is a velocity response vector of the dynamic model of the arch bridge; $\ddot{U}$ is an acceleration response vector of the dynamic model of the arch bridge; E represents an influence vector of the seismic excitation; Y(t) represents a seismic excitation input of the dynamic model of the arch bridge at a certain time t, and the seismic excitation input is a non-stationary random process with an arbitrary time-frequency modulation function; and M and K are obtained through a finite element method, and C is constructed based on a Rayleigh damping theory.

Specifically, a finite element model of the bridge in this example is constructed by using finite element analysis software (such as ANSYS), and the mass matrix, the damping matrix, and the stiffness matrix are derived.

Further, the S3 specifically includes the following steps:
S301: modal decomposition: perform modal decomposition on the dynamic model in the S2 to obtain related data of the first N modes of the dynamic model, including a vibration mode, a frequency and a damping ratio, which are denoted as $\overline{\omega}_i$, $\varphi_i$ and $\xi_i$(i=1, 2, ..., N) respectively, where $\xi_i$ can be calculated as follows:

$$\xi_i = \frac{\alpha + \beta \overline{\omega}_i^2}{2\overline{\omega}_i}; \quad (3)$$

where α and β represent Rayleigh damping coefficients.
S302: spectral decomposition: obtain an expression of the seismic excitation process through the dynamic model in the S2, and spectrally decompose the seismic excitation process using a spectral representation method to obtain the time-frequency deterministic basis function and the orthogonal random variable of the seismic excitation process.

Furthermore, the S302 specifically includes:
use the spectral representation method to spectrally decompose a seismic excitation process Y(t):

$$Y(t) = \sum_{j=1}^{2M} \theta_j y_j(t) \quad (4)$$

where $\theta_j$ (j=1, 2, ..., 2M) represents a $j^{th}$ orthogonal random variable, j is a positive integer ranging from 1 to 2M, and $\theta_j$ is expressed as $$\theta_j = \begin{cases} \sqrt{2S(\omega_{(j+1)/2})\Delta\omega}\, \alpha_{(j+1)/2} & j = 1, 3, \ldots, 2M-1 \\ \sqrt{2S(\omega_{j/2})\Delta\omega}\, \beta_{j/2} & j = 2, 4, \ldots, 2M \end{cases} \quad (5)$$

where S(ω) represents a power spectrum density of a stationary random process corresponding to the seismic excitation process Y(t); $\omega_j$(j=1, 2, ..., 2M) represents M equally spaced frequency points in an evolutionary spectrum frequency domain interval of seismic excitation;

Δω represents a frequency interval of discrete frequency points; $a_j$ and $B_j$ represent $j^{th}$ mean-zero orthogonal random variables; $y_j$ in the formula (4) represents a $j^{th}$ deterministic basis function, which is expressed as $$y_j(t) = \begin{cases} A(\omega_{(j+1)/2}, t)\cos(\omega_{(j+1)/2}t) & j = 1, 3, \ldots, 2M-1 \\ A(\omega_{j/2}, t)\sin(\omega_{j/2}t) & j = 2, 4, \ldots, 2M \end{cases} \quad (6)$$

where t represents a certain moment of the seismic excitation input process; and
A(ω, t) represents the time-frequency slowly varying modulation function of the seismic excitation process.

Specifically, the seismic excitation process Y(t) is spectrally decomposed according to the formula (4). A frequency interval of a seismic evolutionary spectrum is set to [0, 50] rad/s, the frequency interval 40 is set to 0.1 rad/s, and the total number M of discrete frequencies is 501.

Furthermore, the S4 specifically includes:
for the time-frequency slowly varying modulation function A(ω, t) of the seismic excitation process, where $\omega_j$ represents a $j^{th}$ discrete frequency point, obtain the time-frequency slowly varying modulation function $A(\omega_j, t)$ at a determined discrete frequency point, and interpolate the time-frequency slowly varying modulation function $A(\omega_j, t)$ at the discrete frequency point in a time domain by using a piecewise quadratic polynomial, to obtain the interpolated time-frequency slowly varying modulation function $A(\omega_j, t)$ at the discrete frequency point, with an expression as follows:

$$A(\omega_j, t) = \sum_{k=1}^{L_j} \left(a_{k2}^j t^2 + a_{k1}^j t + a_{k0}^j\right)\left[\varepsilon(t - t_k^j) - \varepsilon(t - t_{k+1}^j)\right] \quad (7)$$

in the formula, $L_j$ represents the number of segments of a modulation function at a $j^{th}$ frequency point; $\varepsilon(\cdot)$ represents a unit step function;

$$t_k^j \text{ and } t_{k+1}^j$$

represent left and right time nodes of a $k^{th}$ piecewise polynomial at the $j^{th}$ frequency point;

$$a_{k0}^j, a_{k1}^j \text{ and } a_{k2}^j$$

represent coefficients of the $k^{th}$ piecewise polynomial at the $j^{th}$ frequency point:

$$\begin{Bmatrix} a_{k0}^j \\ a_{k1}^j \\ a_{k2}^j \end{Bmatrix} = \begin{bmatrix} 1 & t_k^j & (t_k^j)^2 \\ 1 & \frac{t_k^j + t_{k+1}^j}{2} & \left(\frac{t_k^j + t_{k+1}^j}{2}\right)^2 \\ 1 & t_{k+1}^j & (t_{k+1}^j)^2 \end{bmatrix}^{-1} \begin{Bmatrix} A(\omega_j, t_k^j) \\ A\left(\omega_j, \frac{t_k^j + t_{k+1}^j}{2}\right) \\ A(\omega_j, t_{k+1}^j) \end{Bmatrix}. \quad (8)$$

Specifically, for each discrete frequency point $\omega_j$ ($j=1, 2, \ldots, 501$), the time-frequency slowly varying modulation function $A(\omega_j, t)$ at the discrete frequency point in a time domain is interpolated by using a piecewise quadratic polynomial. A computation duration is set to 50 s, the number of function segments corresponding to each frequency point is set to 50, segment points evenly spaced apart from each other, starting time for a $k^{th}$ segment function corresponding to the $j^{th}$ frequency point includes (k-1) and k(k=1, 2, \ldots, 50) respectively, and corresponding polynomial coefficients can be calculated according to the formula (8).

Furthermore, the S5 specifically includes the following steps:
S501: calculate N generalized modal displacements of the arch bridge structure using a Duhamel integral formula, and obtain mapping relations between the modal displacements and the orthogonal random variables, where a time-varying mapping coefficient can be obtained by analytical solution; and
S502: substitute a modal response expression derived from the Duhamel integral into a modal decomposition formula of dynamic response of the arch bridge to obtain the explicit expression of non-stationary seismic response of the long-span arch bridge.

Specifically, the N generalized modal displacements $Q_i$ (i=1, 2, \ldots, N) of the arch bridge structure are calculated based on the Duhamel integral formula:

$$Q_i(t) = \int_0^t \frac{P_i(t - \tau)\exp(-\xi_i \varpi_i \tau)\sin\left(\varpi_i\sqrt{1 - \xi_i^2}\,\tau\right)}{\varpi_i\sqrt{1 - \xi_i^2}} d\tau \quad (9)$$

where $P_i$ (i=1, 2, \ldots, N) represents an i-order generalized modal force of the arch bridge structure, which can be expressed as $$P_i(t) = -\varphi_i^T ME \sum_{j=1}^{2M} \theta_j y_j(t) \quad (10)$$

A modal response expression derived from the Duhamel integral is substituted into a modal decomposition formula of dynamic response of the arch bridge to obtain an explicit expression for a response vector of the finite element model of the bridge:

$$U(t) = \sum_{i=1}^{N} \sum_{j=1}^{2M} \varphi_i \theta_j I_{ij}(t) \quad (11)$$

where $I_{ij}(t)$ (i=1, 2, \ldots, N; j=1, 2, \ldots, 2M) represents a coefficient of time-varying mapping between a modal response of the arch bridge structure and an orthogonal variable of excitation, which can be expressed as $$I_{ij}(t) = -\frac{\varphi_i^T ME}{\varpi_i\sqrt{1 - \xi_i^2}} \int_0^t \exp[\xi_i \varpi_i(\tau - t)]\sin\left[\varpi_i\sqrt{1 - \xi_i^2}\,(t - \tau)\right] y_j(\tau) d\tau \quad (12)$$

An expression of a basis function $y_j(t)$ and the interpolated time-frequency slowly varying modulation function $A(\omega_j, t)$ at the discrete frequency point are substituted into the formula (12) to obtain the explicit solution of the time-varying mapping coefficient:

$$I_{ij}(t) = -\frac{\varphi_i^T ME}{2\varpi_i\sqrt{1 - \xi_i^2}} \sum_{m=0}^{2} \begin{cases} \sum_{k=1}^{L_{(j+1)/2}} \sum_{r=1}^{2} a_{km}^{(j+1)/2} J_i^m\left(c_{ir0}^{(j+1)/2}, c_{ir1}^{(j+1)/2}, t_k^{(j+1)/2}, t_{k+1}^{(j+1)/2}, t\right) & j = 1, 3, \ldots, 2M - 1 \\ \sum_{k=1}^{L_{j/2}} \sum_{r=1}^{2} a_{km}^{j/2} J_i^m\left(c_{ir0}^{j/2}, c_{ir1}^{j/2}, t_k^{j/2}, t_{k+1}^{j/2}, t\right) & j = 2, 4, \ldots, 2M \end{cases} \quad (13)$$

Coefficients $c_{ir0}{}^j$ and $c_{ir1}{}^j$ (i=1, 2, ..., N; j=1, 2, ..., M; r=1, 2) in the formula (13) are calculated according to the following formula:

$$\begin{bmatrix} c_{i10}^j & c_{i11}^j \\ c_{i20}^j & c_{i21}^j \end{bmatrix} = \tag{14}$$

$$\begin{cases} \begin{bmatrix} \pi/2 - \varpi_i\sqrt{1-\xi_i^2}\,t & \omega_{(j+1)/2} + \varpi_i\sqrt{1-\xi_i^2} \\ \pi/2 + \varpi_i\sqrt{1-\xi_i^2}\,t & \omega_{(j+1)/2} - \varpi_i\sqrt{1-\xi_i^2} \end{bmatrix} & j = 1, 3, \ldots, 2M-1 \\ \begin{bmatrix} -\varpi_i\sqrt{1-\xi_i^2}\,t & \omega_{j/2} + \varpi_i\sqrt{1-\xi_i^2} \\ \pi + \varpi_i\sqrt{1-\xi_i^2}\,t & \omega_{j/2} - \varpi_i\sqrt{1-\xi_i^2} \end{bmatrix} & j = 2, 4, \ldots, 2M \end{cases}$$

A function $J_i^m$ (i=1, 2, ..., N; m=0, 1, 2) in the formula (13) is defined as $$J_i^m(c_0, c_1, t_1, t_2, t) = \int_{t_1}^{t_2} \tau^m \exp[\xi_i \varpi_i(\tau - t)] \cos(c_1 \tau + c_0) d\tau \tag{15}$$

Explicit solutions are as follows:

$$J_i^0(c_0, c_1, t_1, t_2, t) = \tag{16}$$
$$\frac{u_1(t_2)[\xi_i \varpi_i u_2(t_2) + c_1 u_3(t_2)] - u_1(t_1)[\xi_i \varpi_i u_2(t_1) + c_1 u_3(t_1)]}{c_1^2 + \xi_i^2 \varpi_i^2}$$

$$J_i^1(c_0, c_1, t_1, t_2, t) = \frac{u_1(t_2)[u_2(t_2)u_4(t_2) + u_3(t_2)u_5(t_2)] - u_1(t_1)[u_2(t_1)u_4(t_1) + u_3(t_1)u_5(t_1)]}{(c_1^2 + \xi_i^2 \varpi_i^2)^2} \tag{17}$$

$$J_i^2(c_0, c_1, t_1, t_2, t) = \frac{u_1(t_2)[u_2(t_2)u_6(t_2) + u_3(t_2)u_7(t_2)] - u_1(t_1)[u_2(t_1)u_6(t_1) + u_3(t_1)u_7(t_1)]}{(c_1^2 + \xi_i^2 \varpi_i^2)^3} \tag{18}$$

where functions $u_1$-$u_7$ are defined as:

$$u_1(\tau) = \exp(\xi_i \varpi_i(\tau - t)),\ u_2(\tau) = \cos(c_0 + c_1 \tau),\ u_3(\tau) = \sin(c_0 + c_1 \tau), \tag{19}$$

$$u_4(\tau) = c_1^2 - \xi_i^2 \varpi_i^2 + \xi_i \varpi_i(\xi_i^2 \varpi_i^2 + c_1^2)\tau,\ u_5(\tau) = -2\xi_i \varpi_i c_1 + c_1(\xi_i^2 \varpi_i^2 + c_1^2)\tau,$$

$$u_6(\tau) = 2\xi_i \varpi_i(\xi_i^2 \varpi_i^2 - 3c_1^2) + 2(c_1^4 - \xi_i^4 \varpi_i^4)\tau + \xi_i \varpi_i(\xi_i^2 \varpi_i^2 + c_1^2)^2 \tau^2,$$

$$u_7(\tau) = 2c_1(3\xi_i^2 \varpi_i^2 - c_1^2) - 4\xi_i \varpi_i c_1(\xi_i^2 \varpi_i^2 + c_1^2)\tau + c_1(\xi_i^2 \varpi_i^2 + c_1^2)^2 \tau^2$$

Furthermore, the S6 specifically includes the following steps:

S601: stochasticly simulate S groups of orthogonal random variables using the method in the S302, and sequentially substitute the S groups of orthogonal random variables into the explicit expression of non-stationary seismic response of the long-span arch bridge obtained in the S502, to obtain responses $U_1$, $U_2$, ..., $U_S$ of the long-span arch bridge under the action of corresponding seismic excitation; and

S602: perform statistical analysis on the S groups of response samples obtained in the S601, and assess seismic response characteristics and seismic resistance of the long-span arch bridge from a probabilistic perspective according to statistical analysis results.

Figure 3:
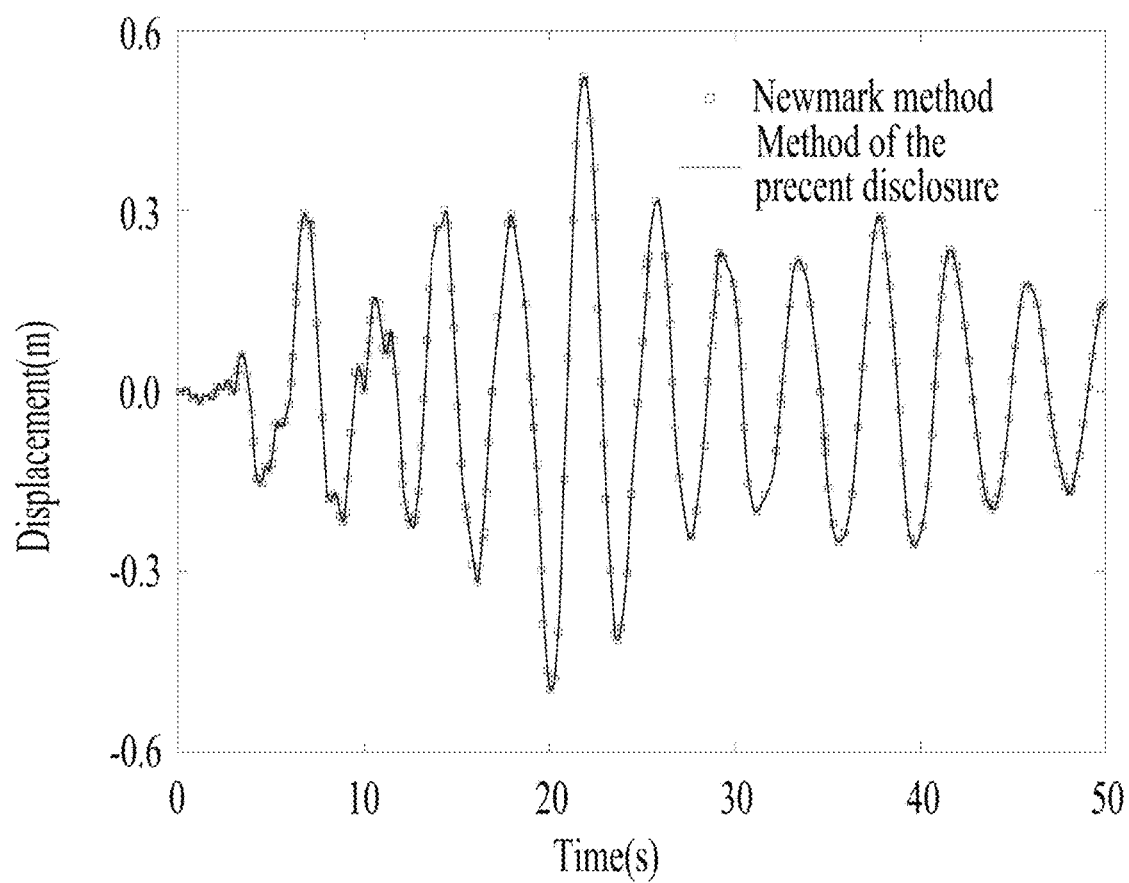
FIG. 3 is a response time-history comparison diagram of a crown of an arch bridge in an axial direction disclosed in the present disclosure.

Specifically, FIG. 3 illustrates a response time-history of a crown of an arch bridge in an axial direction of the arch bridge model obtained by using the method of the present disclosure under the action of seismic samples. For the purpose of comparison, FIG. 3 also illustrates computation results of numerical solving of the dynamic model of the arch bridge by using a Newmark integration method. It can be found that results obtained from use of both methods are quite consistent, indicating that the method of the present disclosure achieves favorable computational accuracy.

Statistical analysis is performed on 10000 groups of response samples obtained, and non-stationary seismic response characteristics of the long-span arch bridge can be assessed from a probabilistic perspective. For instance, a response autocorrelation matrix of the arch bridge is calculated according to the formula (20):

$$E[UU^T] = \frac{1}{10000} \sum_{l=1}^{10000} U_l U_l^T \tag{20}$$

Figure 4:
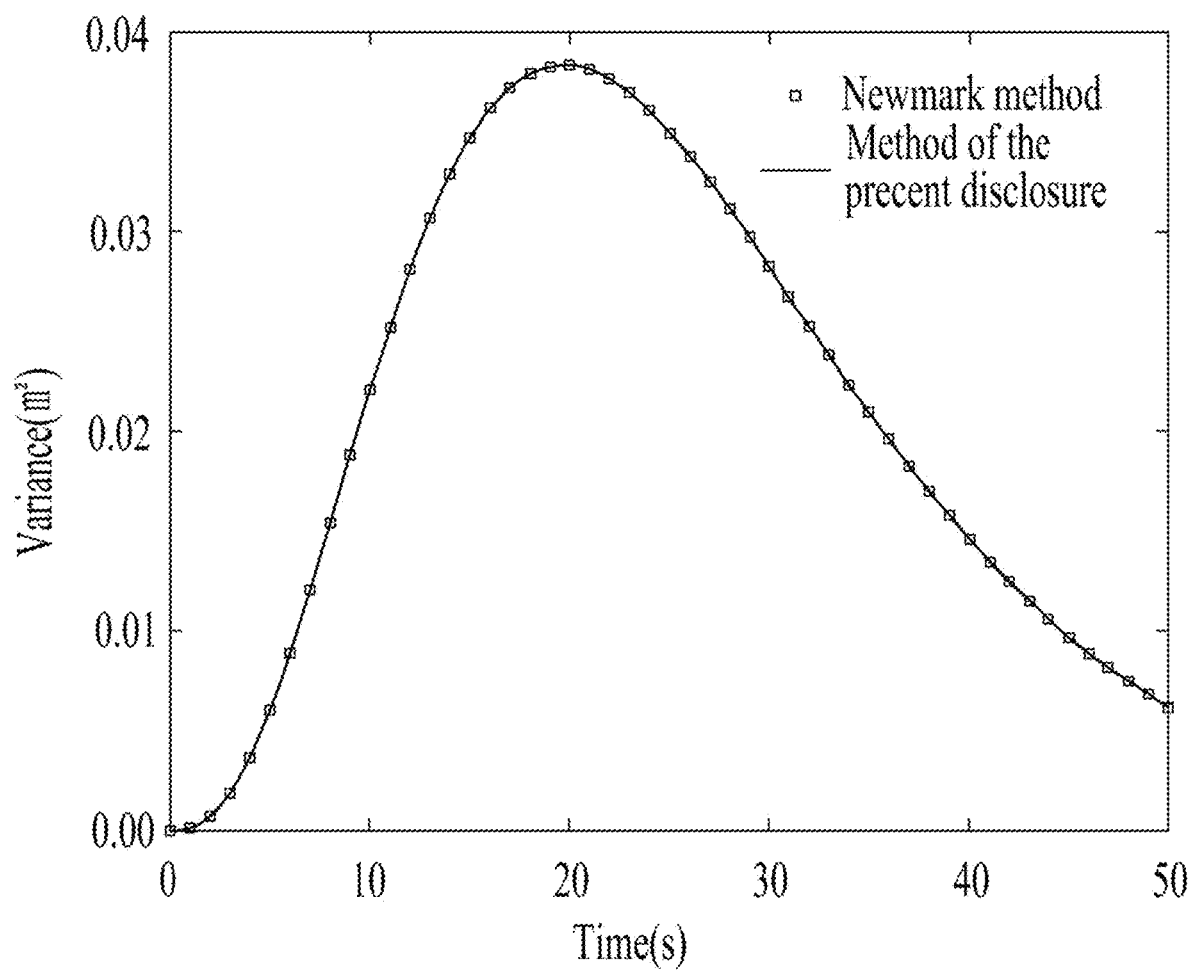
FIG. 4 is a response variance comparison diagram of a crown of an arch bridge in an axial direction disclosed in the present disclosure.

For the purpose of demonstration, FIG. 4 illustrates a time-varying variance of response of the crown of the arch bridge in the axial direction obtained by using the method of the present disclosure. For the purpose of comparison, FIG. 4 illustrates computation results of statistical analysis of the 10000 response samples obtained by using the Newmark integration method. It can found that results obtained from use of both methods are quite consistent, further indicating that the method of the present disclosure achieves favorable computational accuracy. Further, time of computing the 10000 response samples using the method of the present disclosure is only 120.6 s, much shorter than 3.6 h required for the Newmark integration method, indicating that the method of the present disclosure has significant advantages in computational efficiency.

Each example in the description is described in a progressive manner, the same and similar parts between the examples may refer to each other, and each example focuses on the differences from other examples. In particular, a system or system example is basically similar to the method example, such that the description thereof is relatively simple, and a partial description of the method example can be referred to for details. The system and system examples described above are merely schematic, the unit described as a separable component may be physically separated or not, and a component shown as a unit may be a physical unit or not, that is, may be located at one place or may also be distributed on a plurality of network units. Part or all of the modules may be selected according to actual needs to achieve the objective of the solution of the examples of the present disclosure. Those skilled in the art can understand and implement the present disclosure without making creative efforts.

The above description of the disclosed examples enables any person skilled in the art to implement or use the present disclosure. Various modifications to these examples will be readily apparent to those skilled in the art, and the generic principles defined herein may be implemented in other examples without departing from the spirit or scope of the present disclosure. Thus, the present disclosure is not intended to be limited to the examples shown herein, but is to be accorded with the widest scope consistent with the principles and novel features disclosed herein.

What is claimed is:

1. A method for a probabilistic assessment of a seismic resistance of a long-span arch bridge based on a time-frequency hybrid computation, comprising following steps:

S1, acquiring structural parameters of the long-span arch bridge;

S2, constructing a dynamic model of the long-span arch bridge according to the structural parameters acquired in the S1;

S3, reducing the dynamic model of the long-span arch bridge in the S2 through modal decomposition, to obtain related data of first N modes of the dynamic model, and decomposing a seismic excitation by use of a time-frequency spectrum decomposition technology, to obtain a time-frequency deterministic basis function and an orthogonal random variable of a seismic excitation process;

S4, using a quadratic polynomial to piecewise interpolate a modulation function in the time-frequency deterministic basis function in the S3 to obtain a piecewise time-frequency slowly varying modulation function;

S5, based on the piecewise time-frequency slowly varying modulation function obtained in the S4, obtaining an explicit expression of a non-stationary seismic response of a long-span arch bridge structure through the modal decomposition and Duhamel integral; and S6, simulating a seismic excitation sample using the orthogonal random variable obtained in the S3, and quickly computing a response sample through the explicit expression obtained in the S5, to assess the seismic resistance of the long-span arch bridge from a probabilistic perspective.

2. The method for the probabilistic assessment of the seismic resistance of the long-span arch bridge based on the time-frequency hybrid computation according to claim 1, wherein the S2 comprises:
constructing the dynamic model of the long-span arch bridge under a condition of time-frequency non-stationary seismic excitation using a finite element method:

$$M\ddot{U}(t) + C\dot{U}(t) + KU(t) = -MEY(t) \quad (2)$$

wherein M is a mass matrix of the dynamic model of the long-span arch bridge, K is a stiffness matrix of the dynamic model of the long-span arch bridge, C is a damping matrix of the dynamic model of the long-span arch bridge, U is a displacement response vector of the dynamic model of the long-span arch bridge, $\dot{U}$ is a velocity response vector of the dynamic model of the long-span arch bridge $\ddot{U}$ is an acceleration response vector of the dynamic model of the long-span arch bridge, E represents an influence vector of the seismic excitation, Y (t) represents a seismic excitation input of the dynamic model of the long-span arch bridge at a predetermined time t, and the seismic excitation input is a non-stationary random process with an arbitrary time-frequency modulation function; and M and K are obtained through the finite element method, and C is constructed based on a Rayleigh damping theory.

3. The method for the probabilistic assessment of the seismic resistance of the long-span arch bridge based on the time-frequency hybrid computation according to claim 1, wherein the S3 comprises:

S301: the modal decomposition: performing the modal decomposition on the dynamic model in the S2 to obtain the related data of the first N modes of the dynamic model, comprising a vibration mode, a frequency, and a damping ratio, wherein the vibration mode, the frequency, and the damping ratio are denoted as $\bar{\omega}$, $\varphi_i$, and $\xi_i$, (i=1, 2, . . . , N) respectively, wherein $\xi_i$ is calculated as follows:

$$\xi_i = \frac{\alpha + \beta \varpi_i^2}{2\varpi_i}; \quad (3)$$

wherein $\alpha$ and $\beta$ represent Rayleigh damping coefficients; and

S302: spectral decomposition: obtaining an expression of the seismic excitation process through the dynamic model in the S2, and spectrally decomposing the seismic excitation process using a spectral representation method to obtain the time-frequency deterministic basis function and the orthogonal random variable of the seismic excitation process.

4. The method for the probabilistic assessment of the seismic resistance of the long-span arch bridge based on the time-frequency hybrid computation according to claim 3, wherein the S302 comprises:
using the spectral representation method to spectrally decompose the seismic excitation process Y(t):

$$Y(t) = \sum_{j=1}^{2M} \theta_j y_j(t) \quad (4)$$

wherein $\theta_j$(j=1, 2, . . . , 2M) represents a $j^{th}$ orthogonal random variable, j is a positive integer ranging from 1 to 2M, and $\theta_j$ is expressed as $$\theta_j = \begin{cases} \sqrt{2S(\omega_{(j+1)/2})\Delta\omega}\,\alpha_{(j+1)/2} & j = 1, 3, \ldots, 2M-1 \\ \sqrt{2S(\omega_{j/2})\Delta\omega}\,\beta_{j/2} & j = 2, 4, \ldots, 2M \end{cases} \quad (5)$$

wherein S ($\omega$) represents a power spectrum density of a stationary random process corresponding to the seismic excitation process Y(t), $\omega_j$ (j=1, 2, . . . , M) represents M equally spaced frequency points in an evolutionary spectrum frequency domain interval of the seismic excitation, $\Delta\omega$ represents a frequency interval of discrete frequency points, $\alpha_j$ and $\beta_j$ represent $j^{th}$ mean-zero orthogonal random variables, $y_j$ in the formula (4) represents a $j^{th}$ deterministic basis function and is expressed as $$y_j = \begin{cases} A(\omega_{(j+1)/2}, t)\cos(\omega_{(j+1)/2}t) & j = 1, 3, \ldots, 2M-1 \\ A(\omega_{j/2}, t)\sin(\omega_{j/2}t) & j = 2, 4, \ldots, 2M \end{cases} \quad (6)$$

wherein t represents a predetermined moment of a seismic excitation input process, and A ($\omega$, t) represents a time-frequency slowly varying modulation function of the seismic excitation process.

5. The method for the probabilistic assessment of the seismic resistance of the long-span arch bridge based on the time-frequency hybrid computation according to claim 4, wherein the S4 comprises:

for the time-frequency slowly varying modulation function A (@, t) of the seismic excitation process, wherein $\omega_j$ represents a $j^{th}$ discrete frequency point, obtaining a time-frequency slowly varying modulation function A ($\omega_j$, t) at the $j^{th}$ discrete frequency point, and interpolating the time-frequency slowly varying modulation function A ($\omega_j$, t) at the $j^{th}$ discrete frequency point in a time domain by using a piecewise quadratic polynomial, to obtain an interpolated time-frequency slowly varying modulation function A ($\omega_j$, t) at the $j^{th}$ discrete frequency point, with an expression as follows:

$$A(\omega_j, t) = \sum_{k=1}^{L_j} \left( a_{k2}^j t^2 + a_{k1}^j t + a_{k0}^j \right) \left[ \varepsilon(t - t_k^j) - \varepsilon(t - t_{k+1}^j) \right] \quad (7)$$

wherein $L_j$ represents a number of segments of a modulation function at a $j^{th}$ frequency point, $\varepsilon(\cdot)$ represents a unit step function, $t_k^j$ and $t_{k+1}^j$ and right time nodes of a $k^{th}$ piecewise polynomial at the $j^{th}$ frequency point, and $a_{k0}^j$, $a_{k1}^j$, and $a_{k2}^j$ represent coefficients of the $k^{th}$ piecewise polynomial at the $j^{th}$ frequency point:

$$\begin{Bmatrix} a_{k0}^j \\ a_{k1}^j \\ a_{k2}^j \end{Bmatrix} = \begin{bmatrix} 1 & t_k^j & (t_k^j)^2 \\ 1 & \frac{t_k^j + t_{k+1}^j}{2} & \left(\frac{t_k^j + t_{k+1}^j}{2}\right)^2 \\ 1 & t_{k+1}^j & (t_{k+1}^j)^2 \end{bmatrix}^{-1} \begin{Bmatrix} A(\omega_j, t_k^j) \\ A\left(\omega_j, \frac{t_k^j + t_{k+1}^j}{2}\right) \\ A(\omega_j, t_{k+1}^j) \end{Bmatrix}. \quad (8)$$

6. The method for the probabilistic assessment of the seismic resistance of the long-span arch bridge based on the time-frequency hybrid computation according to claim 5, wherein the S5 comprises following steps:

S501: calculating N generalized modal displacements of the long-span arch bridge structure using a Duhamel integral formula, and obtaining mapping relations between the modal displacements and the orthogonal random variables, wherein a time-varying mapping coefficient is obtained by an analytical solution; and S502: substituting a modal response expression derived from the Duhamel integral into a modal decomposition formula of a dynamic response of the long-span arch bridge to obtain the explicit expression of the non-stationary seismic response of the long-span arch bridge.

7. The method for the probabilistic assessment of the seismic resistance of the long-span arch bridge based on the time-frequency hybrid computation according to claim 6, wherein the S6 comprises following steps:

S601: stochasticly simulating S groups of orthogonal random variables using the spectral representation method in the S302, and sequentially substituting the S groups of orthogonal random variables into the explicit expression of the non-stationary seismic response of the long-span arch bridge obtained in the S502, to obtain responses $U_1, U_2, \ldots, U_S$ of the long-span arch bridge under an action of corresponding seismic excitation; and S602: performing a statistical analysis on S groups of response samples obtained in the S601, and assessing seismic response characteristics and the seismic resistance of the long-span arch bridge from the probabilistic perspective according to statistical analysis results.

\* \* \* \* \*